United States Patent [19]

Morghen

[11] Patent Number: 4,801,225
[45] Date of Patent: Jan. 31, 1989

[54] INSERT LOCATING PIN FOR LOCATING A WORKPIECE ON A SUB-PLATE FOR MACHINING

[75] Inventor: Manfred Morghen, San Diego, Calif.
[73] Assignee: General Dynamics Corp./Convair Division, San Diego, Calif.
[21] Appl. No.: 190,317
[22] Filed: May 4, 1988
[51] Int. Cl.$^4$ ............................................. B23Q 3/10
[52] U.S. Cl. ................................ 409/218; 33/567; 269/47
[58] Field of Search ............... 409/218, 241, 219, 220; 408/76, 79; 29/559; 269/20, 309, 303, 316, 47, 50, 21, 48.1, 48.2, 48.4, 51, 52, 53, 54.1; 414/786; 198/345; 33/567, 613, 614; 188/67

[56] References Cited

U.S. PATENT DOCUMENTS

| | | |
|---|---|---|
| 3,286,354 | 11/1966 | Richter ................................. 33/567 |
| 3,888,341 | 6/1975 | Konkal et al. ...................... 198/345 |
| 4,058,885 | 11/1977 | Bergman ............................... 29/559 |
| 4,500,079 | 2/1985 | Morghen .............................. 269/47 |
| 4,538,355 | 9/1985 | Morghen .............................. 33/613 |
| 4,688,974 | 8/1987 | Wright et al. ...................... 409/219 |
| 4,700,488 | 10/1987 | Curti ................................. 269/50 X |
| 4,736,830 | 4/1988 | Hofmann ............................. 198/345 |
| 4,741,523 | 5/1988 | Sato et al. ........................... 269/316 |

FOREIGN PATENT DOCUMENTS 732118  5/1980  U.S.S.R. ............................... 269/47

*Primary Examiner*—William Briggs
*Attorney, Agent, or Firm*—John R. Duncan; Frank D. Gilliam

[57] ABSTRACT

A removable and replaceable insert locating pin adapted to locate a workpiece in a tooling fixture for machining thereof. The locating pin includes a central body inserted in a precisely located aperture in the tooling fixture and an upper portion that extends into an aperture in the workpiece. Hardened inserts are selectively positioned in apertures formed in the outer periphery of the upper portion and contact the sidewall of the aperture in the workpiece for positioning the workpiece on the sub-plate in a desired direction or directions. Flexibility of the set up of the tooling for machining of workpiece is enhanced.

9 Claims, 1 Drawing Sheet

INSERT LOCATING PIN FOR LOCATING A WORKPIECE ON A SUB-PLATE FOR MACHINING

BACKGROUND OF THE INVENTION

This invention relates to an improvement in a locating pin intended to be used in cooperation with tooling in the machining of metal workpieces, and more particularly, but not by way of limitation, to a removable and replaceable locating pin adapted to locate a workpiece on a sub-plate for machining of the workpiece.

Numerous types of locating pins are known in the prior art as operable to support a part on a machine or position a workpiece on a tooling jig. These locating pins are often used with a gauge plate for setting fixtures and the like, such plates conventionally comprising a base and an accurately formed top surface with a plurality of circumferentially spaced accurately formed and located openings therein. Obviously, such a gauge plate is expensive and time consuming to manufacture because each opening must be very accurately located with relation to the other openings. In addition, any changes in temperature is use may cause the gauge plate to lose its accuracy.

The prior art locating pins are often of "round" and "relieved" configuration. They are often used together, mounted on a fixture a distance apart corresponding to a distance between two apertures on a workpiece. When a workpiece is placed on the locator pins the round one provides restraint in all directions and the relieved locator is so designed to provide transverse restraint only.

One commonly used prior art relieved locator pin is commonly referred to as a diamond locator pin, because of its essentially diamond shaped cross section. In use, however, known prior art locator pins are subject to a number of defects. One class of locator pins are elemental in construction and provide only the most rudimentary type of locator pin.

Commonly, locator pins of the first type include only a bushing that is press fitted into a hole in a fixture or sub-plate. A locating pin is then inserted into the bushing or is pre inserted into the bushing prior to it being press fitted into the fixture. Such locator pins while acceptable for some applications are non-adjustable and cannot be easily replaced or interchanged with other pins as the need should arise.

Examples of the latter type of locator pins previously discussed are shown in U.S. Pat. Nos. 2,497,679; 3,1518,045; and 3,286,354. Characteristically, this type of locator pin provides for a central bore to be formed in the fixture or sub-plate. A plurality of eccentrically formed sleeves are then inserted within one another and rotated until a desired orientation has been achieved to provide the desired locator hole. The sleeves are then locked into position by one or more particularly configured bolts which bear against the outer periphery of one or more of the eccentric sleeves.

The present invention provides a simple, readily manufactured locator pin that may be easily inserted into a fixture and which has a locating portion that may be easily inserted into a fixture and which has a locating portion that may be easily interchanged or replaced as the need should arise.

SUMMARY OF THE INVENTION

Briefly stated, the present invention contemplates a removable and replaceable locating pin adapted to locate a workpiece on a sub-plate for machining the workpiece which includes a central body which is adapted to be secured as by press fitting with a precisely located aperture in a sub-plate or fixture which receives a workpiece on its upper surface for machining thereof. The central body is provided with a generally annularly shaped upwardly extending portion that extends into a suitable aperture formed in the workpiece. The annularly shaped upper portion is sized so that it is loosely received within said aperture, said annularly shaped member being provided at its outer periphery with at least two opposing apertures, each aperture communicating with the space between the workpiece and the annular member. An insert is positioned within each aperture in the annular member and is sized so as to contact the sidewall of the aperture in the workpiece and to locate the workpiece in at least one direction of movement.

Each insert is formed of a substance which is harder than that used to form said annularly shaped portion and has the portion thereof that contacts the inner sidewall of the aperture within the workpiece relieved to increase the area of contact between the insert and the sidewall.

A plurality of apertures may be arranged around the outer periphery of the annular portion and are adapted to receive suitable inserts so that the insert locating pin of the instant invention may precisely locate the workpiece in more than one direction on the surface of the sub-plate, for example, in the X and Y directions. Means are provided to permit easy removal and replacement of the inserts.

Various other advantages and features of the invention will become apparent to those skilled in the art from the following description, taken in conjunction with the accompanying drawing.

DETAILED DESCRIPTION OF THE DRAWING

Figure 1:
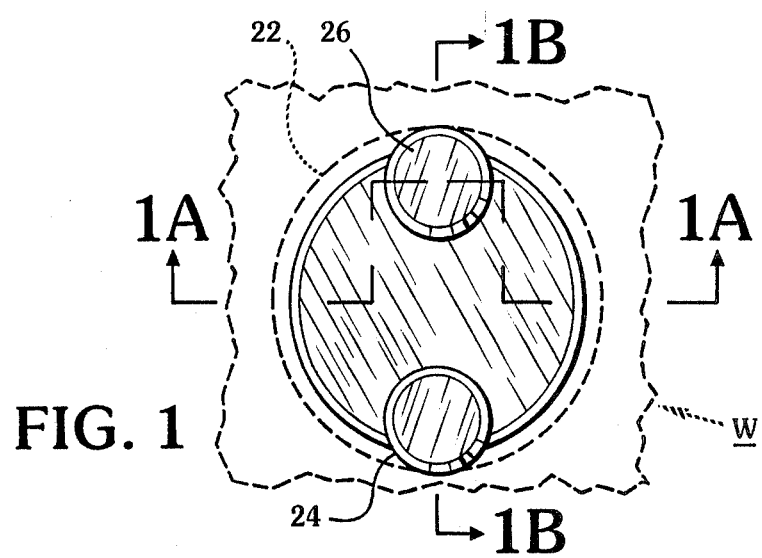
FIG. 1 is a fragmentary plan view illustrating one embodiment of a removable and replaceable locating pin constructed in accordance with the present invention and showing a workpiece being precisely positioned on a subplate for machining.
Figure 1A:
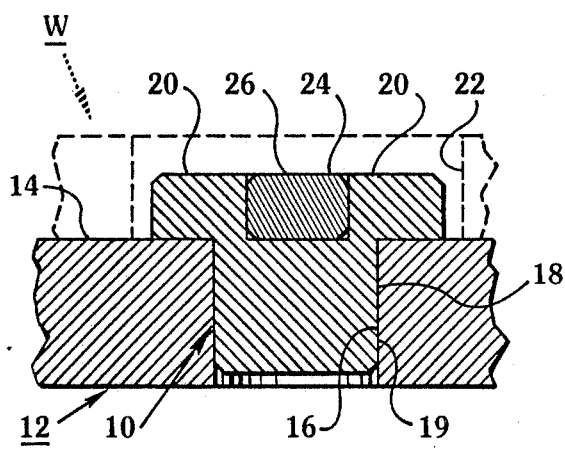
FIG. 1A is a fragmentary section taken along lines 1A—1A in FIG. 1.
Figure 1B:
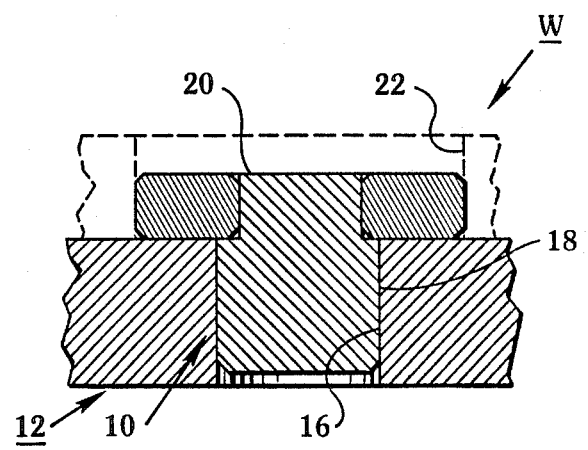
FIG. 1B is a fragmentary section taken along lines 1B—1B in FIG. 1 and particularly illustrates the inserts of the insert locating pin precisely locating a workpiece on the accurate upper surface of the sub-plate.

Referring now to the drawing in detail and in particular to FIGS. 1, 1A, and 1B, the reference character 10 generally designates a removable and replaceable locating pin adapted to locate precisely a workpiece W on a sub-plate or fixture 12 for machining of said workpiece W. The sub-plate or fixture 12 is one such as is generally known in the art for machining metal workpieces and is generally constructed of a metal such as aluminum or steel. The sub-plate 12 has an accurately finished upper surface 14 for receiving the workpiece W for machining thereof.

The sub-plate 12 is provided with an aperture 16, preferably in the form of a precisely aligned vertically extending hole having a predetermined bore, formed within the sub-plate 12 at a predetermined location. The locating pin 10 includes a generally cylindrically shaped central body that is received in the aperture 16. The central body 18 is press fitted slip fitted within the bore 19 by any known means. It would also be within the scope of the present invention to position the locating pin 10 upon the sub-plate 12 by means of the ball lock receiver arrangement seen in U.S. Pat. No. 4,500,079 or the jam nut bushing arrangement of U.S. Pat. No. 4,538,355, the disclosure of both patents being incorporated herein by reference. U.S. Pat. Nos. 4,500,079 and 4,538,355 are both issued to me and are assigned to the assignee of the instant application.

The central body 18 is provided with an upwardly extending portion 20 that extends upwardly from the planar surface of the sub-plate into a recess or aperture 22 in a workpiece W. The annularly shaped upper portion 20 of the central body 18 is sized so that it is loosely received within said aperture, said upper portion also being provided at its outer periphery with two opposing apertures 24, each aperture 24 communicating with the space between the workpiece and the annular portion 20.

An insert 26 is positioned within each aperture 24 in the upper portion 20 and is sized so as to contact the sidewall of the aperture 22 in the workpiece W and to locate precisely the workpiece on the upper planar surface 14 of the sub-plate 12 in at least one direction for machining thereof.

Preferably, the central body 18 and its upper portion 20 are formed of a material such as a suitable soft steel while the inserts 26 are formed of a material such as a long wearing carbide or a hardened tool steel. Each insert 26 may also have the portion that contacts the inner sidewall of the aperture 22 in the workpiece W relieved in order to increase the area of contact between the insert 26 and the sidewall 22.

Figure 2:
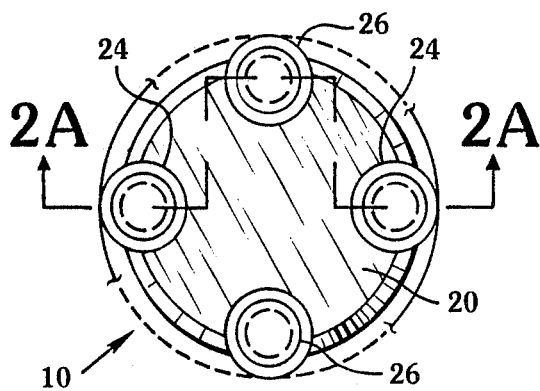
FIG. 2 is a fragmentary plan view of a second embodiment of the present invention and illustrates how the insert locating pin of the instant invention may position a workpiece in more than one direction.
Figure 2A:
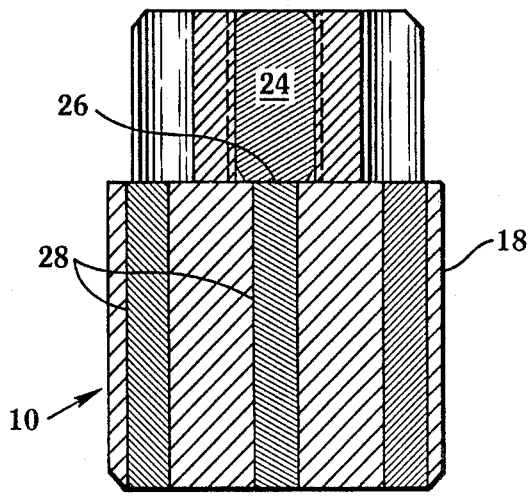
FIG. 2A is a fragmentary section taken along lines 2A—2A in FIG. 2.

Referring now to FIGS. 2 and 2A, another embodiment of the present invention will be illustrated. Again as in FIGS. 1, 1A, and 1B, like reference characters will refer to like structural elements. In the embodiment of the locating pin shown in FIG. 2, the locating pin 10 is provided with an upper portion 20 that has a plurality of apertures 24 with the complementary inserts arranged around the outer periphery thereof for precisely locating the workpiece W in more than one direction. In FIG. 2 it will be seen that the upper portion 20 of the second embodiment is provided with two opposing sets of inserts 26 for precisely locating the workpiece W in an X and a Y direction. It will also be seen FIG. 2A that the central body 18 of the locating pin 10 may be provided with vertically extending bores 28 that permit communication with the inserts 26 from beneath the body 18 and thereby permit easy removal of the inserts 26 as may be required for maintenance of the tooling.

It can thus be seen that the present invention provides an easily removable and replaceable locating pin for locating a workpiece and greatly machining thereof. The cost to produce and maintain the insert locating pin of the instant invention is significantly less than that of other locating pins since no special production equipment is required and standard stock material can be used with only minimum machining being required. After long wear only the smaller, lower cost inserts need to be replaced, which can be especially effective for larger pins.

While I have described my invention in connection with certain possible forms or embodiments thereof and have used, therefore, certain specific terms in connection with certain specific examples of my invention, is to be understood that the present disclosure is illustrative rather than restrictive and that locating pins having varying configurations may be resorted to without departing from the spirit or scope of the claims which follow.

I claim:

1. An insert locating pin adapted to be securely positioned within an aperture having a predetermined position in a sub-plate for locating a workpiece on the upper planar surface of the sub-plate in at least one direction, said locating pin extending from the sub-plate upwardly into an aperture provided in the workpiece and into contact with a sidewall of said aperture, comprising:
    a central body that is positioned within an aperture in the sub-plate and which has a generally angularly shaped upper portion that extends into the aperture in the workpiece, the annular portion being sized so that it is loosely received within said aperture, said annular portion being provided at its outer periphery with at least two opposing apertures, each aperture communication with the space between the workpiece and the annular upper portion each aperture being separated and of a generally accurate configuration when viewed from the top of the locating pin; and
    an insert positioned within each aperture in the annular portion and being sized so as to contact the sidewall of the aperture in the workpiece and to locate the workpiece in at least one direction of movement.

2. The insert locating pin of claim 1 wherein each insert is formed of a substance which is harder than that used to form said central body and its upper portion.

3. The insert locating pin of claim 2 wherein the central body and its upper portion is formed of soft steel.

4. The insert locating pin of claim 2 wherein the inserts are made from a long wear carbide.

5. The insert locating pin of claim 2 wherein the inserts are made from hardened tool steel.

6. The insert locating pin of claim 2 wherein each insert also has the portion that contacts the inner sidewall relieved to increase the are of contact between the insert and the sidewall of the aperture in the workpiece.

7. The insert locating pin of claim 2 wherein the upper portion of the central body is provided with four equally spaced apart apertures and complementary inserts to provide precise location of the workpiece on the sub-plate in more than one direction.

8. The insert locating pin of claim 7 wherein the apertures and the complementary inserts provided therein are arranged in two opposing pairs to locate the workpiece in two directions.

9. The insert locating pin of claim 7 wherein the central body is provided with vertically extending bores that communicate with the apertures provided in the outer periphery of the annular portion whereby the inserts positioned in such apertures may be easily removed.

* * * * *